US010608237B2

(12) United States Patent
Lee et al.

(10) Patent No.: US 10,608,237 B2
(45) Date of Patent: Mar. 31, 2020

(54) SECONDARY BATTERY

(71) Applicant: SAMSUNG SDI CO., LTD., Yongin-si, Gyeonggi-do (KR)

(72) Inventors: Hong-Hyeon Lee, Yongin-si (KR); Sang-Won Byun, Yongin-si (KR); Won-Jun Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 836 days.

(21) Appl. No.: 14/660,883

(22) Filed: Mar. 17, 2015

(65) Prior Publication Data
US 2015/0287977 A1 Oct. 8, 2015

(30) Foreign Application Priority Data

Apr. 7, 2014 (KR) .................. 10-2014-0041237

(51) Int. Cl.
H01M 2/34 (2006.01)
H01M 2/04 (2006.01)
H01M 2/12 (2006.01)
H01M 2/30 (2006.01)
H01M 10/04 (2006.01)

(52) U.S. Cl.
CPC ......... *H01M 2/345* (2013.01); *H01M 2/0404* (2013.01); *H01M 2/1211* (2013.01); *H01M 2/1223* (2013.01); *H01M 2/1229* (2013.01); *H01M 2/30* (2013.01); *H01M 10/0436* (2013.01); *H01M 2200/20* (2013.01); *Y10T 29/4911* (2015.01)

(58) Field of Classification Search
None
See application file for complete search history.

(56) References Cited

U.S. PATENT DOCUMENTS 6,159,631 A * 12/2000 Thompson .......... H01M 2/0225
220/203.08
2004/0175609 A1* 9/2004 Yageta ................ H01M 2/0202
429/82

(Continued)

FOREIGN PATENT DOCUMENTS

KR 10-2012-0089983 A 8/2012
KR 10-2012-0115439 A 10/2012

OTHER PUBLICATIONS

Camfil, Negative Pressure Rooms, 2013; 2 pages total.*

*Primary Examiner* — Ula C Ruddock
*Assistant Examiner* — Anna Korovina
(74) *Attorney, Agent, or Firm* — Lewis Roca Rothgerber Christie LLP

(57) ABSTRACT

A secondary battery having improved safety includes an electrode assembly, a case configured to accommodate the electrode assembly, and a cap assembly coupled to the case. The cap assembly includes a cap plate configured to cover the case and defining a short-circuit opening therein, a short-circuit plate exterior to the cap plate and positioned such that at least a portion of the short-circuit plate is positioned in the short-circuit opening, a first deformable plate inside the cap plate, and a cover exterior to the short-circuit plate extending over the short-circuit plate. A space defined between the cover and the first deformable plate has a negative pressure.

15 Claims, 7 Drawing Sheets

(56) References Cited

U.S. PATENT DOCUMENTS

| | | | |
|---|---|---|---|
| 2010/0279156 A1* | 11/2010 | Kim | H01M 2/0404 429/56 |
| 2011/0014501 A1* | 1/2011 | Scheucher | B60K 1/04 429/7 |
| 2011/0039136 A1* | 2/2011 | Byun | H01M 2/0404 429/56 |
| 2011/0183197 A1* | 7/2011 | Byun | H01M 2/04 429/185 |
| 2012/0040214 A1* | 2/2012 | Kim | H01M 2/1241 429/56 |
| 2012/0114993 A1* | 5/2012 | Park | H01M 2/1072 429/88 |
| 2012/0183818 A1 | 7/2012 | Byun et al. | |
| 2012/0214030 A1* | 8/2012 | Guen | H01M 2/0404 429/61 |
| 2012/0258339 A1 | 10/2012 | Kim | |
| 2013/0029190 A1* | 1/2013 | Kim | H01M 2/34 429/61 |
| 2013/0115511 A1* | 5/2013 | Han | H01M 2/1241 429/208 |
| 2013/0330581 A1* | 12/2013 | Kim | H01M 2/345 429/61 |
| 2015/0249241 A1* | 9/2015 | Han | H01M 2/1235 429/56 |
| 2015/0255777 A1* | 9/2015 | Guen | H01M 2/04 429/53 |
| 2015/0263329 A1* | 9/2015 | Guen | H01M 2/345 429/53 |
| 2016/0260960 A1* | 9/2016 | Guen | H01M 2/345 |
| 2016/0276648 A1* | 9/2016 | Guen | H01M 2/345 |
| 2016/0293930 A1* | 10/2016 | Guen | H01M 2/345 |
| 2016/0308189 A1* | 10/2016 | Lee | H01M 2/345 |

* cited by examiner

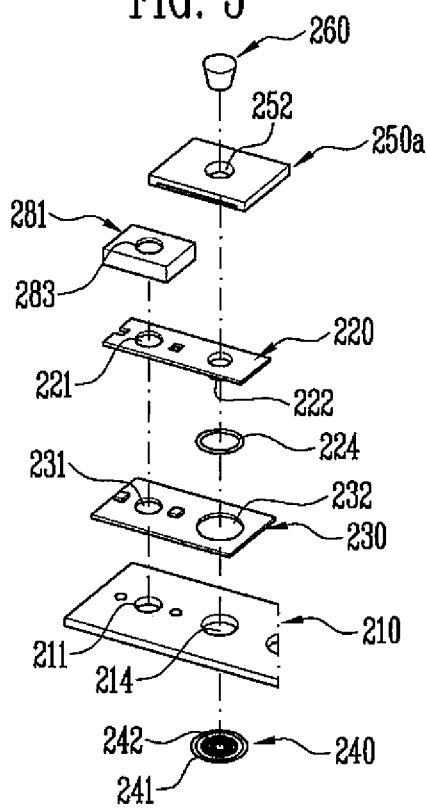
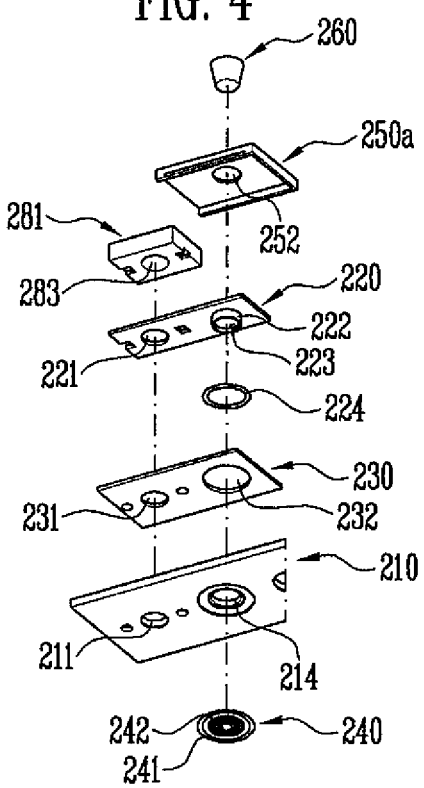

SECONDARY BATTERY

CROSS-REFERENCE TO RELATED APPLICATION

This application claims priority to and the benefit of Korean Patent Application No. 10-2014-0041237, filed on Apr. 7, 2014, in the Korean intellectual Property Office, the entire contents of which are incorporated herein by reference.

BACKGROUND

1. Field

Aspects of the present invention relate to a secondary battery.

2. Description of the Related Art

Recently, secondary batteries have been widely used as power sources for portable electronic devices as well as for vehicles power systems. Since portable electronic devices are used in various fields, a demand for secondary batteries is rapidly increasing. Secondary batteries may be recharged or discharged to be used several times. Hence, secondary batteries are both economically effective and environmentally friendly, further encouraging their use.

With the miniaturization and weight reduction of electronic devices, the miniaturization and weight reduction of the secondary batteries powering these devices is also required. However, because secondary batteries contain highly reactive materials such as lithium, this imposes limitations on reducing the size and weight of these secondary batteries due to safety concerns. Therefore, further research is directed toward secondary batteries which can have a reduction in size and weight while maintaining or enhancing safety.

SUMMARY

An aspect of the present invention is directed toward a secondary battery having improved safety.

According to an embodiment of the present invention, a secondary battery includes an electrode assembly, a case configured to accommodate the electrode assembly, and a cap assembly coupled to the case. The cap assembly may include a cap plate configured to cover the case and may define a short-circuit opening, a short-circuit plate exterior to the cap plate and positioned such that at least a portion of the short-circuit plate is in the short-circuit opening, a first deformable plate inside the cap plate, and a cover exterior to the short-circuit plate which may extend over the short-circuit plate. A space defined between the cover and the first deformable plate may have a negative pressure.

The first deformable plate may be configured to be deformed from a first state where the first deformable plate is spaced apart from the short-circuit plate, to a deformed state where the first deformable plate contacts the short-circuit plate in the short-circuit opening. When the first deformable plate is in the first state, the space between the cover and the first deformable plate may have a negative pressure.

The first deformable plate may include a first round portion that is convex in a direction facing away from the short-circuit plate in the first state, and the first round portion may be deformed to be convex toward the short-circuit plate, in the deformed state.

The first deformable plate may be configured to deform when an internal pressure of the secondary battery exceeds a set pressure.

When the first deformable plate is in the first state, the space between the cover and the first deformable plate may have a first volume, and, when the first deformable plate is in the deformed state, the space between the cover and the first deformable plate may have a second volume. The first volume may be greater than the second volume.

When the first deformable plate is in the first state, an amount of air corresponding to a difference between the first volume and the second volume may be discharged from the space between the cover and the first deformable plate to create a negative pressure in the space.

The cover may include a blocking member configured to block an air hole defined in the cover to prevent air circulation between an exterior of the secondary battery and the space defined between the cover and the first deformable plate.

The blocking member may be configured to extend over the air hole after the air is discharged through the air hole to create the negative pressure in the space.

The cover may include a second deformable plate configured to extend over an opening defined in the cover to prevent air circulation between an exterior of the secondary battery and the space defined between the cover and the first deformable plate.

The second deformable plate may include a second round portion that is convex in a direction facing away from the short-circuit plate.

The second round portion of the second deformable plate may be configured to be deformed from being convex in a direction toward the short-circuit plate to being convex in the direction facing away from the short-circuit plate to create a negative pressure in the space between the cover and the first deformable plate.

The secondary battery may be configured to prevent air circulation between an exterior of the secondary battery and the space defined between the cover and the first deformable plate.

According to another embodiment of the present invention, a method of manufacturing a secondary battery includes accommodating an electrode assembly in a case, coupling a cap assembly to the case, and creating a negative pressure in a space between a cover of the cap assembly and a first deformable plate. The cap assembly may include a cap plate configured to cover the case and defining a short-circuit opening, a short-circuit plate exterior to the cap plate and positioned such that at least a portion of the short-circuit plate is in the short-circuit opening, a first deformable plate inside the cap plate, and a cover exterior to the short-circuit plate and extending over the short-circuit plate.

The creating the negative pressure may include discharging air through an air hole defined in the cover, and closing the air hole by placing a blocking member over the air hole.

The creating the negative pressure may include deforming a second round portion of a second deformable plate configured to extend over an opening defined in the cover from a position facing the short-circuit plate to a position facing away from the short-circuit plate.

Other features and aspects of the invention will become apparent from the following description, taken in connection with the accompanying drawings.

The terminologies or words used in the description and the claims of the present invention should not be interpreted as being limited merely to common and/or dictionary meanings. On the contrary, they should be interpreted based on the meanings and concepts of the invention in keeping with the scope of the invention on the basis of the principle that the inventor(s) can appropriately define the terms in order to describe the invention.

According to an embodiment of the present invention, a negative pressure is created in a space between the first deformable plate and the cover, thus resulting in improved or enhanced safety.

BRIEF DESCRIPTION OF THE DRAWINGS

Example embodiments will be described more fully hereinafter with reference to the accompanying drawings; however, they may be embodied in different forms and should not be construed as being limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Further, when a first element is being described as "coupled" or "connected" to a second element, the first element may be directly coupled or connected to the second element, or indirectly coupled or connected to the second element with one or more intervening elements therebetween. Like reference numerals refer to like elements throughout.

FIGS. 3 and 4 are exploded perspective views showing portions of a cap assembly of the secondary battery shown in FIG. 1;

DETAILED DESCRIPTION

Figure 1:
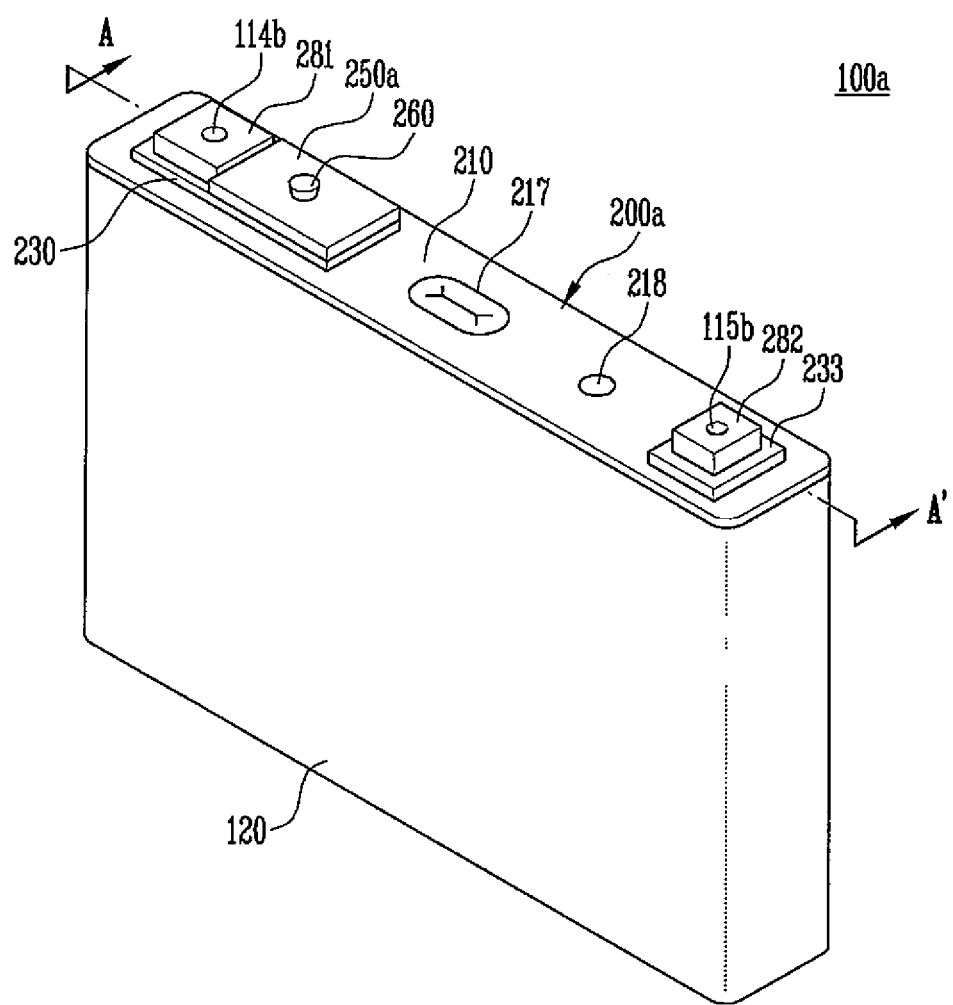
FIG. 1 is a perspective view showing a secondary battery according to an embodiment of the present invention.

The present invention will be described more fully hereinafter with reference to the accompanying drawings, in which example embodiments of the inventions are shown. This invention may, however, be embodied in many different forms and should not be construed as being limited to the embodiments set forth herein. Like reference numerals designate like elements throughout the specification.

Hereinafter, embodiments of the present invention will be described in detail with reference to the accompanying drawings.

Figure 2:
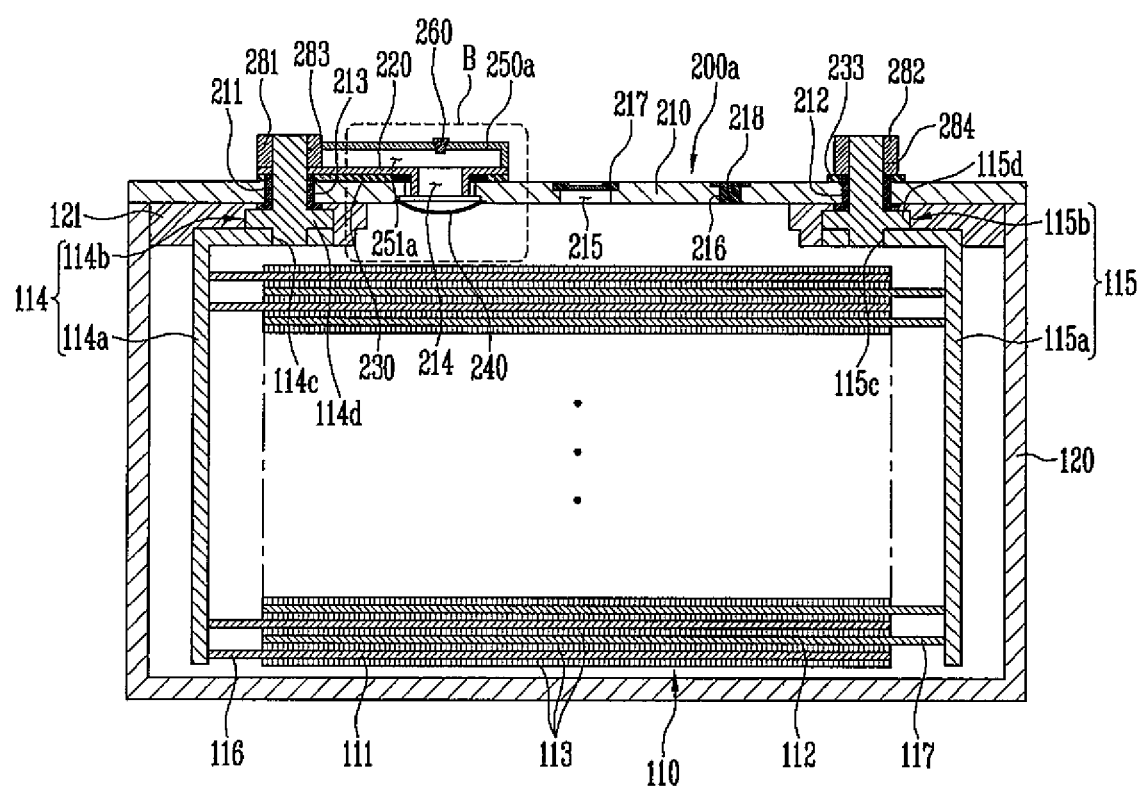
FIG. 2 is a cross-sectional view of the secondary battery taken along the line A-A' of FIG. 1.

FIG. 1 is a perspective view showing a secondary battery 100a according to an embodiment of the present invention, and FIG. 2 is a cross-sectional view of the secondary battery 100a taken along the line A-A' of FIG. 1. The secondary battery 100a according to this embodiment will be described below with reference to FIGS. 1 and 2.

As shown in FIGS. 1 and 2, the secondary battery 100a according to an embodiment includes an electrode assembly 110, a case 120, and a cap assembly 200a. The cap assembly 200a, in an embodiment, includes a cap plate 210, a short-circuit plate 220, a first deformable plate 240, and a cover 250a, where a negative pressure may be created in a space 251a between the first deformable plate 240 and the cover 250a.

The electrode assembly 110 generates electro-chemical energy by the movement of ions and/or electrons. For example, the electrode assembly 110 may include a first electrode plate 111 serving as a negative pole (or negative electrode), a second electrode plate 112 serving as a positive pole (or positive electrode), and a separator 113 therebetween.

The first electrode plate 111, in this embodiment, is formed by applying a first electrode active material such as graphite or carbon to a first electrode collector formed of a metal foil such as nickel or copper, for example. The first electrode plate 111 may include a region on which the first active material is not applied (e.g., a first electrode non-coating portion 116). In this embodiment, the first electrode non-coating portion 116 may serve as a current flow path between the first electrode plate 111 and an exterior of the secondary battery 100a. Further, the second electrode plate 112, in this embodiment, is formed by applying a second electrode active material such as a transition metal oxide to a second electrode collector formed of a metal foil such as aluminum. The second electrode plate 112 may include a region on which the second active material is not applied (e.g., a second electrode non-coating portion 117). In this embodiment, the second electrode non-coating portion 117 may serve as a current flow path between the second electrode plate 112 and the exterior of the secondary battery 100a. Further, the separator 113, in this embodiment, is between the first electrode plate 111 and the second electrode plate 112, thus preventing or reducing the likelihood of a short-circuit and allowing lithium ions to move. In an embodiment, the separator 113 may be a film made of polyethylene, polypropylene, or combinations thereof. Although the first electrode plate 111 is the negative pole (or negative electrode) and the second electrode plate 112 is the positive pole (or positive electrode) in this embodiment, the first electrode plate 111 may be the positive pole (or positive electrode) and the second electrode plate 112 may be the negative pole (or negative electrode), in other embodiments.

In an embodiment, a first terminal unit 114 and a second terminal unit 115 may be coupled to both ends of the electrode assembly 110 to electrically connect or couple to the first electrode plate 111 and the second electrode plate 112, respectively. In this embodiment, the first terminal unit 114 may be made of a conductive material such as copper, and may include a first collector plate 114a and a first electrode terminal 114b. The first collector plate 114a may be connected or coupled to the first electrode non-coating portion 116 of the first electrode plate 111 and may have a bent shape, with a first terminal opening 114c defined in an end of the first collector plate 114a. Further, the first electrode terminal 114b, in this embodiment, may be electrically connected or coupled through the first terminal opening 114c to the first collector plate 114a, and may pass through a first opening 211 of the cap plate 210 to be exposed to the exterior of the secondary battery 100a. The first electrode terminal 114b, in this embodiment, includes a first flange 114d that is wider than both the first opening 211 and the first terminal opening 114c, thus allowing the first electrode terminal 114b to be aligned between the first opening 211 and the first terminal opening 114c. The second terminal unit 115, in an embodiment, is formed of a conductive material such as aluminum. The second terminal unit 115 may include a second collector plate 115a connected or coupled to the second electrode non-coating portion 117 of the second electrode plate 112, and a second electrode terminal 115b electrically connected or coupled to the second collector plate 115a via a second terminal opening 115c of the second collector plate 115a. The second electrode terminal 115b, in an embodiment, may pass through a second opening 212 of the cap plate 210 to be exposed to the exterior of the secondary battery 100a. Further, the second electrode terminal 115b, in this embodiment, may include a second flange 115d.

The case 120, in an embodiment, is a member for accommodating the electrode assembly 110 therein.

In this embodiment, the case 120 may be made of a conductive metal, for example, aluminum, aluminum alloy, or nickel-plated steel, and may have the shape of a box having an opening to allow the electrode assembly 110 to be inserted and seated therein. The inner surface of the case 120 may undergo an insulation process to be insulated from the electrode assembly 110. In these embodiments, the case 120 may serve as either of a negative pole (or negative electrode) or a positive pole (or positive electrode).

The case 120 may accommodate the electrode assembly 110 together with an electrolyte. In this embodiment, the electrolyte may be a lithium salt, such as LiPF6 or LiBF4, contained in an organic solvent such as ethylene carbonate (EC), propylene carbonate (PC), diethyl carbonate (DEC), ethyl methyl carbonate (EMC), or dimethyl carbonate (DMC), and may be a liquid-phase, solid-phase, or gel-phase. Further, the case 120, in an embodiment, may include a lower insulating member 121 to prevent or reduce the likelihood of a short-circuit from occurring between the case 120 and the electrode assembly 110, in addition to aligning the position of the electrode assembly 110.

FIGS. 3 and 4 are exploded perspective views showing portions of the cap assembly 200a of the secondary battery 100a shown in FIG. 1. Hereinafter, the cap assembly 200a of the secondary battery 100a according to an embodiment will be described with reference to FIGS. 2 through 4.

As shown in the embodiments illustrated in FIGS. 2 through 4, the cap assembly 200a is a member that is coupled to the opening of the case 120, and may include a cap plate 210, a short-circuit plate 220, a first deformable plate 240, and a cover 250a.

The cap plate 210, in this embodiment, is configured to cover and seal the opening of the case 120.

In this embodiment, the cap plate 210 may be made of the same material as the case 120, with the first opening 211 and the second opening 212 defined in the cap plate 210. Further, the first electrode terminal 114b and the second electrode terminal 115b, according to an embodiment, may pass through the first opening 211 and the second opening 212, respectively, to be exposed to the exterior of the secondary battery 100a. A gasket 213 may be interposed between each of the first and second electrode terminals 114b and 115b and the cap plate 210, thus preventing external moisture from permeating the secondary battery 100a through the first and second openings 211 and 212, as well as preventing the electrolyte from leaking out from the secondary battery 100a. The cap plate 210, in an embodiment, may be electrically connected or coupled to the second electrode terminal 115b serving as the positive pole (or positive electrode) or the second collector plate 115a, such that the cap plate 210 may have the same polarity as the second terminal unit 115 or the second electrode plate 112.

Further, a short-circuit opening 214, a vent opening 215, and an injection opening 216 may be defined in the cap plate 210 to be between the first and second openings 211 and 212, according to an embodiment. In this embodiment, a vent plate 217 may be configured to cover the vent opening 215, and may be opened when a pressure exceeds a preset or determined pressure. The injection opening 216, according to an embodiment, is used to inject the electrolyte into the case 120, and may be sealed by a stopper 218 after the electrolyte has been injected.

The short-circuit plate 220, in this embodiment, is exterior to the cap plate 210 such that at least portion of the short-circuit plate 220 is positioned in the short-circuit opening 214.

In this embodiment, the short-circuit plate 220 includes a third opening 221. The first electrode terminal 114b may pass through the third opening 221 to be electrically connected or coupled to the first electrode terminal 114b. Further, in order to prevent or reduce the likelihood of a short-circuit from occurring between the short-circuit plate 220 and the cap plate 210, an insulating member 230 may be interposed between the short-circuit plate 220 and the cap plate 210. In this embodiment, a fourth opening 231 may be defined in the insulating member 230 such that the first electrode terminal 114b passes therethrough, and the insulating member 230 and the short-circuit plate 220 are sequentially positioned exterior to the cap plate 210. Thus, the first electrode terminal 114b, in this embodiment, passes sequentially through the first opening 211, the fourth opening 231, and the third opening 221, when viewed from a bottom to top direction.

In an embodiment, the short-circuit plate 220 may include a protrusion 222 located through the short-circuit opening 214. In this embodiment, a corresponding opening 232 may be defined in the insulating member 230 to correspond to the short-circuit opening 214. The protrusion 222 may protrude from an underside of the short-circuit plate 220 to be sequentially inserted through the corresponding opening 232 and the short-circuit opening 214. Further, in an embodiment, a sealing member 224 may be on an outer surface of the protrusion 222 to prevent an inflow of foreign matters through the short-circuit opening 214. Such a sealing member 224 may have the shape of an O-ring, for example. The sealing member 224 may be shaped to fit within the corresponding opening 232 of the insulating member 230 between the cap plate 210 and the short-circuit plate 220, or may be shaped to be inserted through the short-circuit opening 214 and surround an inner wall of the cap plate 210. In order to prevent a short-circuit caused by contact of the inner wall of the cap plate 210 having the short-circuit opening 214 and the protrusion 222 of the short-circuit plate 220, a sectional area of the short-circuit opening 214 may be defined larger than that of the protrusion 222, and the sealing member 224 may be positioned in the corresponding opening 232 to align the position of the protrusion 222.

The protrusion 222 may have the shape of a circular pipe, for example, with an opening 223 defined in the protrusion 222.

Figure 5:
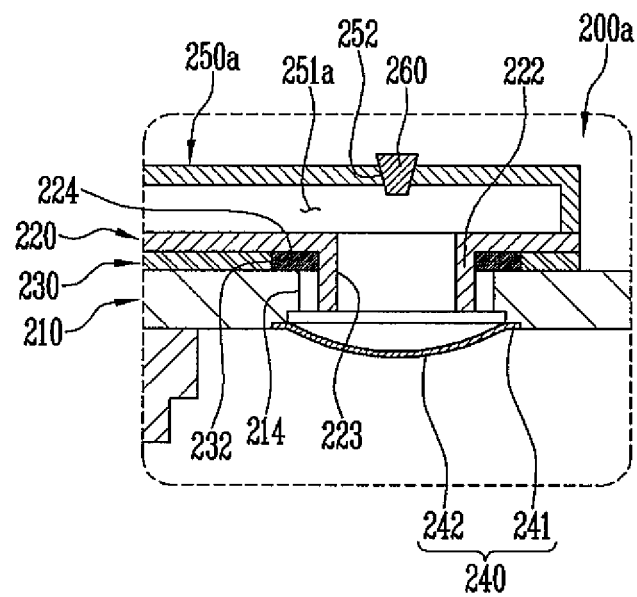
FIGS. 5 and 6 are enlarged cross-sectional views showing portions of the secondary battery marked portion B in FIG. 2 to illustrate an operation of a first deformable plate of the secondary battery.
Figure 6:
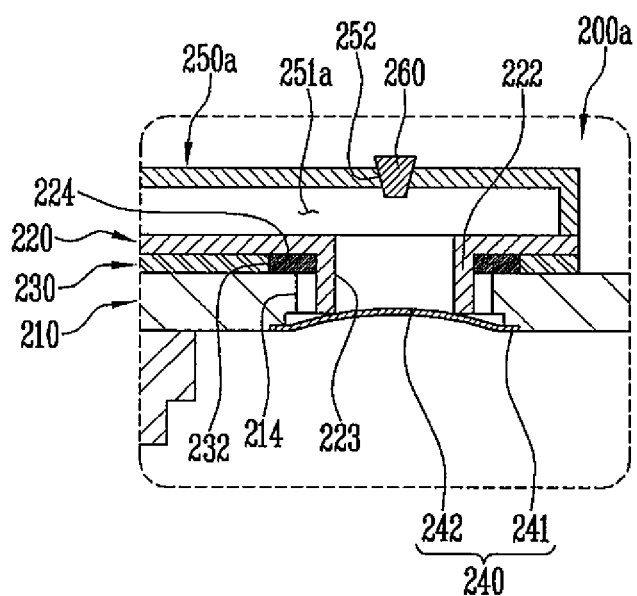

FIGS. 5 and 6 are enlarged cross-sectional views showing portions of the secondary battery 100a marked portion B in FIG. 2 to illustrate the operation of the first deformable plate 240 of the secondary battery 100a. Hereinafter, the first deformable plate 240 according to this embodiment will be described with reference to FIGS. 2 through 6.

The first deformable plate 240, in this embodiment, is a deformable member located at an interior of the cap plate 210. The first deformable plate 240 and the short-circuit plate 220 may be on opposite sides of the cap plate 210. The first deformable plate 240 may be connected or coupled to the cap plate 210 that is electrically connected or coupled to the second terminal unit 115 or the second electrode plate 112 to serve as a positive pole (or positive electrode), for example. Further, the first deformable plate 240, in an embodiment, may include a first rim portion 241 that is secured around the short-circuit opening 214, and a first round portion 242 located inside the first rim portion 241 to protrude out. In an embodiment, in an undeformed state or "normal" state, the first round portion 242 of the first deformable plate 240 may be convex in a direction facing away from the short-circuit plate 220, as shown in FIG. 5. In another embodiment, in a deformed state as shown in FIG. 6, the first round portion 242 may be deformed to be convex towards the short-circuit plate 220 such that the first round portion 242 may come into contact with the protrusion 222 of the short-circuit plate 220. In this embodiment, in the undeformed state, the first round portion 242 may be spaced apart from the short-circuit plate 220. On the contrary, in the deformed state, the first round portion 242 may be convex in a direction toward the short-circuit plate 220 to come into contact with the protrusion 222.

In this embodiment, the first deformable plate 240 may be deformed by the following property: if the internal pressure of the secondary battery 100a is larger than a predetermined or set pressure as the secondary battery 100a is overcharged and gas is produced therein, the gas tends to be discharged to the outside. In an embodiment, if the first deformable plate 240 is deformed as shown in FIG. 6, it may come into contact with the protrusion 222 that is electrically connected or coupled to the first terminal unit 114, thus causing a short-circuit. For example, according to an embodiment of the present invention, the short-circuit may occur between the protrusion 222 having the negative pole (or negative electrode) and the first deformable plate 240 having the positive pole (or positive electrode), thus being capable of protecting the secondary battery 100a.

The cover 250a, in an embodiment, is exterior to the short-circuit plate 220 to extend over or cover the short-circuit plate 220.

In this embodiment, the cover 250a may extend over or cover the short-circuit plate 220 to create a space between the cover 250a and the short-circuit plate 220. In this embodiment, the space may communicate with a space in which the first deformable plate 240 is positioned, via the opening 223 defined in the protrusion 222 of the short-circuit plate 220. Thus, a space between the cover 250a and the first deformable plate 240, in this embodiment, may be the communicating space 251a. Further, an air hole 252 may be defined in the cover 250a, according to an embodiment. The air hole 252 may be sealed by a blocking member 260 on the cover 250a. Thus, the space 251a between the cover 250a and the first deformable plate 240 may be isolated from the exterior of the secondary battery 100a to prevent air circulation between the space 251a and the exterior of the secondary battery 100a.

In an embodiment where a volume of the space 251a between the cover 250a and the first deformable plate 240 when the first deformable plate 240 is in the undeformed state as shown in FIG. 5 is a first volume, and where a volume of the space 251a between the cover 250a and the first deformable plate 240 when the first deformable plate 240 is in the deformed state as shown in FIG. 6 is a second volume, the first volume when the first deformable plate 240 is convex towards the exterior of the secondary battery 100a may be greater than the second volume when the first deformable plate 240 is convex toward the interior. In an embodiment where the first deformable plate 240 is deformed such that the volume of the space 251a between the cover 250a and the first deformable plate 240 changes from the first volume to the second volume, the air should be discharged by a difference between the first volume and the second volume. Unless the air is discharged, the pressure in the space 251a between the cover 250a and the first deformable plate 240 will increase, thus increasing risk or making it difficult to deform the first deformable plate 240. In an example, if an air discharge path is formed, foreign matters may enter the secondary battery 100a through the path into the space 251a between the cover 250a and the first deformable plate 240. Thus, although the internal pressure of the secondary battery 100a may increase, in this example, the first deformable plate 240 may not be deformed at a proper time due to the foreign matters that may have entered the space 251a, thus possibly causing an explosion of the secondary battery 100a and threatening safety.

In order to minimize or reduce this problem, according to an embodiment of the present invention, the space 251a between the cover 250a and the first deformable plate 240 may be configured to have a negative pressure, as described in greater detail below.

Figure 7:
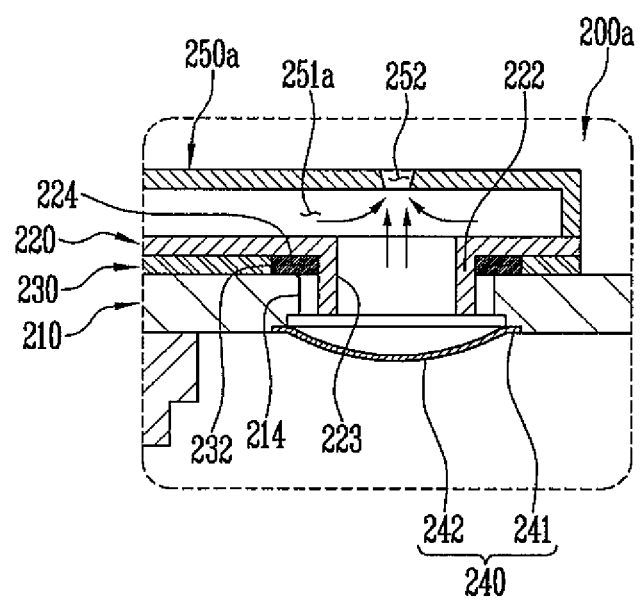
FIGS. 7 and 8 are cross-sectional views illustrating a method of manufacturing the secondary battery shown in FIG. 5.
Figure 8:
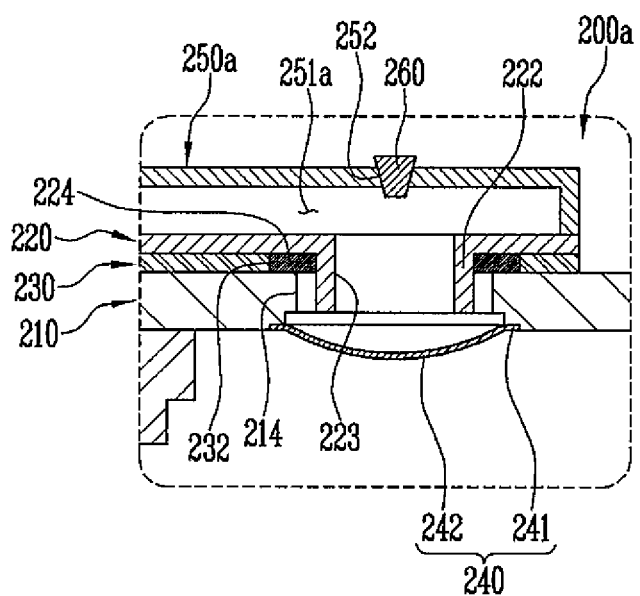

FIGS. 7 and 8 are cross-sectional views illustrating a method of manufacturing the secondary battery 100a shown in FIG. 5. Hereinafter, the method of manufacturing the secondary battery 100a according to this embodiment will be described with reference to FIGS. 7 and 8.

The method of manufacturing the secondary battery 100a according to this embodiment includes accommodating the electrode assembly 110 in the case 120 and coupling the cap assembly 200a to the case 120. Thereafter, as shown in FIG. 7, the air present in the space 251a between the cover 250a and the first deformable plate 240 may be drawn through the air hole 252 of the cover 250a. In this embodiment, the air is discharged from the space 251a between the cover 250a and the first deformable plate 240, such that the space 251a may have a low pressure that approximates a vacuum, as compared to the exterior of the secondary battery 100a. In this embodiment, the amount of air drawn from the space 251a between the cover 250a and the first deformable plate 240 may correspond to the difference between the first volume and the second volume under external atmospheric pressure, for example. Thus, the space 251a between the cover 250a and the first deformable plate 240 may have a negative pressure, namely, a pressure lower than an external pressure.

Next, as shown in FIG. 8, the method of manufacturing the secondary battery 100a according to this embodiment includes blocking the air hole 252 of the cover 250a with the blocking member 260 such that no air circulation occurs between the exterior of the secondary battery 100a and the space 251a defined between the cover 250a and the first deformable plate 240, thus allowing the space 251a between the cover 250a and the first deformable plate 240 to maintain the negative pressure. In an embodiment, if the first deformable plate 240 is deformed when the space 251a between the cover 250a and the first deformable plate 240 maintains the negative pressure, the amount of air present in the space 251a between the cover 250a and the first deformable plate 240 remains unchanged while the volume is decreased. Thus, the pressure in the space 251a between the cover 250a and the first deformable plate 240, in this embodiment, increases to approximate external pressure. Therefore, in this embodiment, it is unnecessary to discharge the amount of air that corresponds to the difference between the first volume and the second volume, and, it may be unnecessary to circulate air between the space 251a and the exterior of the secondary battery 100a. As a result, it is unnecessary to form the air discharge path, in this embodiment, the absence of which prevents the inflow of foreign matters through the path, thus eliminating or reducing several risks, for example, damage to the first deformable plate 240.

The cap assembly 200a of the secondary battery 100a according to an embodiment of the present invention may further include a first terminal plate 281 and a second terminal plate 282, as shown in FIGS. 1 through 4.

In these embodiments, the first terminal plate 281 may be exterior to the short-circuit plate 220 and may surround the first electrode terminal 114b, so that the first terminal plate 281 may be electrically connected or coupled to the first electrode terminal 114b. The first terminal plate 281 may have a first electrode opening 283 through which the first electrode terminal 114b passes. Thus, the first electrode terminal 114b, in an embodiment, passes sequentially through the first opening 211 of the cap plate 210, the fourth opening 231 of the insulating member 230, the third opening 221 of the short-circuit plate 220, and the first electrode opening 283 of the first terminal plate 281, when viewed in the bottom to top direction. An end of the first electrode terminal 114b passing through the first electrode opening 283 of the first terminal plate 281 may be fastened to the first terminal plate 281, e.g., by riveting. Further, in an embodiment, at least a portion of the first terminal plate 281 is brought into contact with the short-circuit plate 220, thus helping the short-circuit plate 220 to have the same polarity as the first electrode terminal 114b. In order to achieve this more efficiently, the first terminal plate 281 may extend to a space between the cover 250a and the short-circuit plate 220, in an embodiment.

Further, the second terminal plate 282 may be exterior to the cap plate 210, with a second electrode opening 284 defined in the second terminal plate 282. After the second electrode terminal 115b passes through the second electrode opening 284, the second electrode terminal 115b may be fastened to the second electrode opening 284, e.g., by riveting, according of an embodiment. Further, in an embodiment, an insulating member 233 may be between the second terminal plate 282 and the cap plate 210. In this embodiment, the second terminal unit 115 and the cap plate 210 may be electrically connected or coupled to each other (e.g., via another path).

Figure 9:
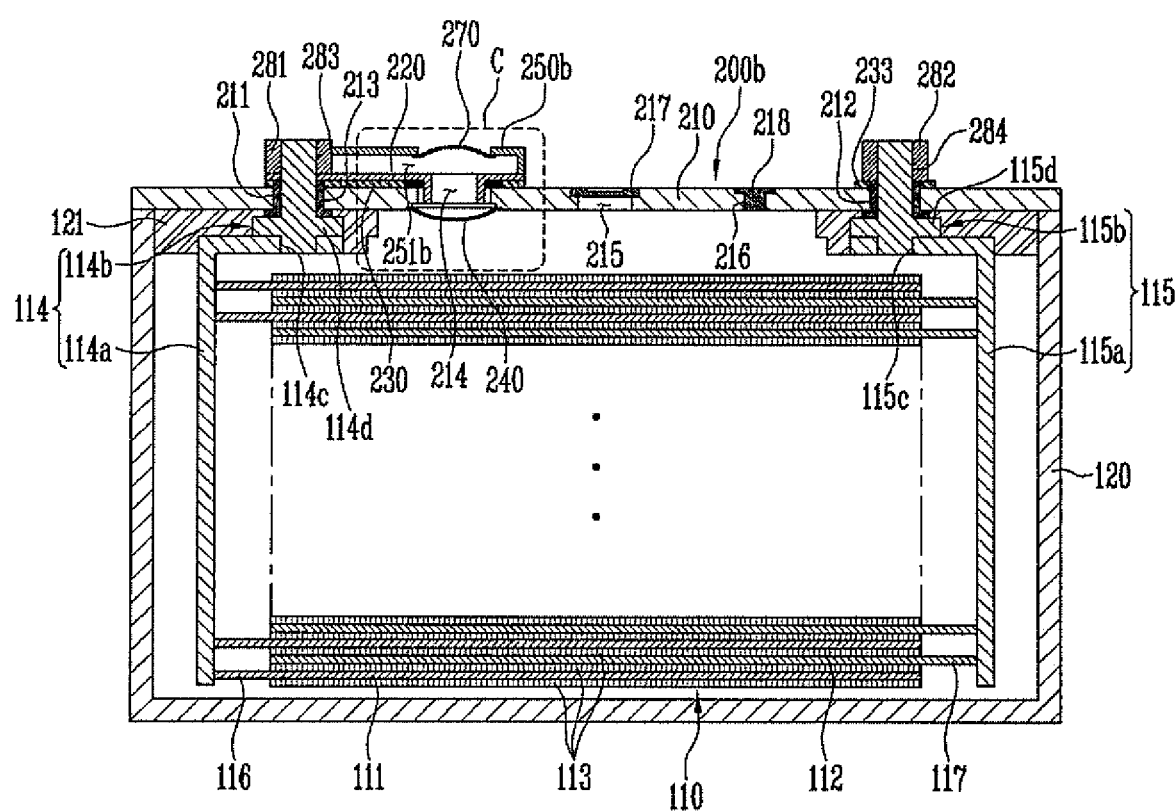
FIG. 9 is a cross-sectional view showing a secondary battery according to another embodiment of the present invention.
Figure 10:
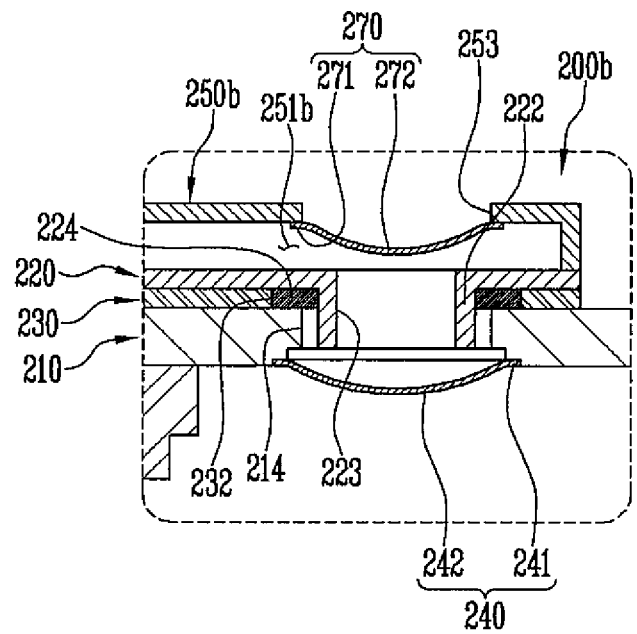
FIGS. 10 and 11 are enlarged cross-sectional views of the secondary battery marked portion C in FIG. 9 to illustrate a method of manufacturing the secondary battery.
Figure 11:
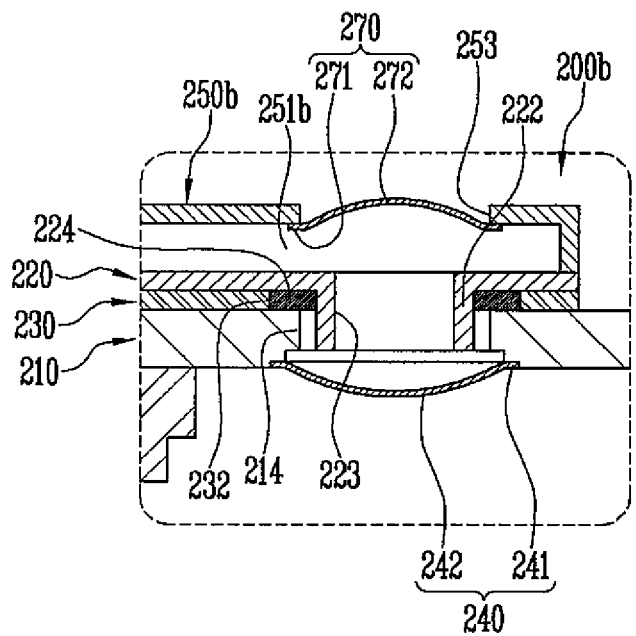

FIG. 9 is a cross-sectional view showing a secondary battery 100b according to another embodiment of the present invention, and FIGS. 10 and 11 are enlarged cross-sectional views of the secondary battery 100b marked portion C in FIG. 9 to illustrate a method of manufacturing the secondary battery 100b. Hereinafter, the secondary battery 100b according to these embodiments will be described with reference to FIGS. 9 through 11. Components common to these and the previously described embodiments will carry the same reference numerals, and a duplicated description thereof will be omitted.

As shown in FIG. 9, the secondary battery 100b according to this embodiment includes the electrode assembly 110, the case 120, and a cap assembly 200b. The cap assembly 200b, in this embodiment, includes the cap plate 210, the short-circuit plate 220, the first deformable plate 240, and a cover 250b. The cap assembly 200b, in this embodiment, also includes a second deformable plate 270 in an opening 253 of the cover 250b, resulting in a space 251b between the first deformable plate 240 and the cover 250b to have a negative pressure. More specifically, as shown in the embodiment illustrated in FIG. 11, the second deformable plate 270 may include a second rim portion 271 that is on the cover 250b around the opening 253, and a second round portion 272 that is positioned inside the second rim portion 271 and is convex towards an exterior of the cover 250b, namely, in a direction facing away from the short-circuit plate 220. In this embodiment, the second round portion 272 may be configured to create the negative pressure in the space 251b between the cover 250b and the first deformable plate 240 by deforming the second round portion 272 such that it is changed from a state which is convex toward the short-circuit plate 220 to a state which is convex in the direction facing away from the short-circuit plate 220 (described below in further detail).

The method of manufacturing the secondary battery 100b according to an embodiment will be described below with reference to FIGS. 10 and 11.

The method of manufacturing the secondary battery 100b according to this embodiment includes accommodating the electrode assembly 110 in the case 120 and coupling the cap assembly 200b to the case 120. In this embodiment, as shown in FIG. 10, the second round portion 272 of the second deformable plate 270 of the cap assembly 200b may be convex towards the short-circuit plate 220, and the space 251b between the cover 250b and the first deformable plate 240 may have the same pressure as the exterior of the secondary battery 100b.

Next, as shown in FIG. 11, the method of manufacturing the secondary battery 100b according to this embodiment includes deforming the second deformable plate 270 such that it is forcibly deformed to increase a volume of the space 251b between the cover 250b and the first deformable plate 240. In this embodiment, air circulation is blocked between the exterior of the secondary battery 100b and the space 251b defined between the cover 250b and the first deformable plate 240. Thus, the amount of air present in the space 251b between the cover 250b and the first deformable plate 240 may remain unchanged while a volume may be increased. Hence, the space 251b between the cover 250b and the first deformable plate 240, in this embodiment, may have a negative pressure that is less than external pressure. In this embodiment, if the first deformable plate 240 is deformed when the space 251b between the cover 250b and the first deformable plate 240 maintains the negative pressure, the amount of air present in the space 251b between the cover 250b and the first deformable plate 240 remains unchanged while the volume is decreased. Thus, the pressure in the space 251b between the cover 250b and the first deformable plate 240 approximates the external pressure, in this embodiment. As a result, it may be unnecessary to discharge the air from the space 251b between the cover 250b and the first deformable plate 240, according to this embodiment.

Example embodiments have been disclosed herein, and although specific terms have been employed, they are used and are to be interpreted in a generic and descriptive sense only, and not for the purpose of limitation. In some instances, as would be apparent to one of ordinary skill in the art, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the application as a whole and in the following claims.

What is claimed is:

1. A secondary battery comprising:
an electrode assembly;
a case configured to accommodate the electrode assembly; and
a cap assembly coupled to the case,
wherein the cap assembly comprises:
a cap plate configured to cover the case and defining a short-circuit opening;
a short-circuit plate exterior to the cap plate and positioned such that at least a portion of the short-circuit plate is in the short-circuit opening;
a first deformable plate inside the cap plate; and
a cover exterior to the short-circuit plate extending over the short-circuit plate,
wherein a space defined between the cover and the first deformable plate has a negative pressure relative to a reference external pressure, the space being in communication with the first deformable plate through an opening of the short-circuit plate and extending outward from the opening of the short-circuit plate,
wherein the first deformable plate is configured to be deformed from a first state in which the first deformable plate is spaced apart from the short-circuit plate, to a deformed state in which the first deformable plate contacts the short-circuit plate in the short-circuit opening, the first deformable plate having a plate shape closing the short-circuit opening in each of the first state and the deformed state, and wherein the space between the cover and the first deformable plate is closed by the first deformable plate together with a blocking member or a second deformable plate, and
wherein when the first deformable plate is in the first state, the space between the cover and the first deformable plate has the negative pressure, and when the first deformable plate is in the deformed state, the space between the cover and the first deformable plate approximates the reference external pressure.

2. The secondary battery of claim 1, wherein the first deformable plate comprises a first round portion that is convex in a direction facing away from the short-circuit plate in the first state, and
the first round portion is deformed to be convex toward the short-circuit plate, in the deformed state.

3. The secondary battery of claim 1, wherein the first deformable plate is configured to deform when an internal pressure of the secondary battery exceeds a set pressure.

4. The secondary battery of claim 1, wherein, when the first deformable plate is in the first state, the space between the cover and the first deformable plate has a first volume, and, when the first deformable plate is in the deformed state, the space between the cover and the first deformable plate has a second volume, and
wherein the first volume is greater than the second volume.

5. The secondary battery of claim 4, wherein, when the first deformable plate is in the first state, an amount of air corresponding to a difference between the first volume and the second volume is discharged from the space between the cover and the first deformable plate to create the negative pressure in the space.

6. The secondary battery of claim 1, wherein the cover comprises the blocking member configured to block an air hole defined in the cover to prevent air circulation between an exterior of the secondary battery and the space defined between the cover and the first deformable plate.

7. The secondary battery of claim 6, wherein, the blocking member is configured to extend over the air hole after the air is discharged through the air hole to create the negative pressure in the space.

8. The secondary battery of claim 1, wherein the cover comprises the second deformable plate configured to extend over an opening defined in the cover to prevent air circulation between an exterior of the secondary battery and the space defined between the cover and the first deformable plate.

9. The secondary battery of claim 8, wherein the second deformable plate comprises a second round portion that is convex in a direction facing away from the short-circuit plate.

10. The secondary battery of claim 9, wherein the second round portion of the second deformable plate is configured to be deformed from being convex in a direction toward the short-circuit plate to being convex in the direction facing away from the short-circuit plate to create the negative pressure in the space between the cover and the first deformable plate.

11. The secondary battery of claim 1, wherein the secondary battery is configured to prevent air circulation between an exterior of the secondary battery and the space defined between the cover and the first deformable plate.

12. A method of manufacturing a secondary battery, comprising:
accommodating an electrode assembly in a case,
coupling a cap assembly to the case, and
creating a negative pressure relative to a reference external pressure in a space between a cover of the cap assembly and a first deformable plate;
wherein the cap assembly comprises:
a cap plate configured to cover the case and defining a short-circuit opening;
a short-circuit plate exterior to the cap plate and positioned such that at least a portion of the short-circuit plate is in the short-circuit opening;
the first deformable plate inside the cap plate; and
the cover exterior to the short-circuit plate extending over the short-circuit plate,
wherein the space is in communication with the first deformable plate through an opening of the short-circuit plate and extends outward from the opening of the short-circuit plate,
wherein the first deformable plate is configured to be deformed from a first state in which the first deformable plate is spaced apart from the short-circuit plate, to a deformed state in which the first deformable plate contacts the short-circuit plate in the short-circuit opening, the first deformable plate having a plate shape closing the short-circuit opening in each of the first state and the deformed state, and wherein the space between the cover and the first deformable plate is closed by the first deformable plate together with a blocking member or a second deformable plate, and
wherein when the first deformable plate is in the first state, the space between the cover and the first deformable plate has the negative pressure, and when the first deformable plate is in the deformed state, the space between the cover and the first deformable plate approximates the reference external pressure.

13. The method of claim 12, wherein, the creating the negative pressure comprises discharging air through an air hole defined in the cover, and closing the air hole by placing the blocking member over the air hole.

14. The method of claim 12, wherein, the creating the negative pressure comprises deforming a second round portion of the second deformable plate configured to extend over an opening defined in the cover from a position facing the short-circuit plate to a position facing away from the short-circuit plate.

15. The secondary battery of claim 1, further comprising a vent opening spaced apart from the space between the cover and the first deformable plate and configured to be opened to release an internal pressure of the secondary battery to an outside when the internal pressure exceeds a set pressure.

* * * * *